US012700590B2

(12) United States Patent

Xu et al.

(10) Patent No.: US 12,700,590 B2
(45) Date of Patent: Aug. 4, 2026

(54) MIXING PROCESS FOR PREPARING HIGH NICKEL CATHODE MATERIAL AND APPLICATION THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Shuaijun Xu, Foshan (CN); Changdong Li, Foshan (CN); Dingshan Ruan, Foshan (CN); Weijian Liu, Foshan (CN); Fengguang Li, Foshan (CN); Weijia Zhang, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 546 days.

(21) Appl. No.: 18/216,623

(22) Filed: Jun. 30, 2023

(65) Prior Publication Data

US 2023/0352679 A1 Nov. 2, 2023

Related U.S. Application Data

(63) Continuation of application No. PCT/CN2021/142277, filed on Dec. 29, 2021.

(30) Foreign Application Priority Data

Mar. 29, 2021 (CN) .......................... 202110330244.6

(51) Int. Cl.
*H01M 4/525* (2010.01)
*H01M 4/04* (2006.01)
(Continued)

(52) U.S. Cl.
CPC ......... *H01M 4/525* (2013.01); *H01M 4/0471* (2013.01); *H01M 4/485* (2013.01); *H01M 4/505* (2013.01); *H01M 10/0525* (2013.01)

(58) Field of Classification Search
CPC ..... H01M 4/505; H01M 4/525; H01M 4/0471
See application file for complete search history.

(56) References Cited

U.S. PATENT DOCUMENTS

2012/0058267 A1* 3/2012 Stueven ................ C08F 220/06
427/222
2019/0375651 A1* 12/2019 Mays .................... H01M 4/525
2022/0098054 A1* 3/2022 Lee ..................... H01M 4/0471

FOREIGN PATENT DOCUMENTS

CN 107895793 A 4/2018
CN 108199037 A 6/2018
(Continued)

OTHER PUBLICATIONS

International Search Report of PCT Patent Application No. PCT/CN2021/142277 issued on Mar. 11, 2022.

*Primary Examiner* — Brittany L Raymond
(74) *Attorney, Agent, or Firm* — Westbridge IP LLC

(57) ABSTRACT

The invention discloses a mixing process for preparing a high nickel cathode material and its use. The mixing process is to add a precursor and a lithium source to a mixing device for mixing to obtain a mixture. After the mixture is uniformly mixed, the mixture is mixed. While the material equipment continues to operate, spray the liquid into the mixture. After the liquid spray is completed, the material is discharged, and the obtained mixture is put into a sagger for sintering. The liquid is pure water, ethanol, nitrogen methyl (Continued)

pyrrolidone, and additive solution. Or one or more of additive dispersions. The spray mixing process of the present invention can make the mixture more uniform, and because of the presence of a proper amount of mist droplets, the surface of the lithium source is slightly soluble in water and can adsorb the precursor.

3 Claims, 2 Drawing Sheets

(51) Int. Cl.
    *H01M 4/485*            (2010.01)
    *H01M 4/505*            (2010.01)
    *H01M 10/0525*         (2010.01)

(56)                     References Cited

FOREIGN PATENT DOCUMENTS

| CN | 108258188 A | 7/2018 |
|----|-------------|--------|
| CN | 109888269 A | 6/2019 |
| CN | 107768619 B | 4/2020 |
| CN | 111987294 A | 11/2020 |
| WO | WO 2020-153701 * | 7/2020 |

* cited by examiner

MIXING PROCESS FOR PREPARING HIGH NICKEL CATHODE MATERIAL AND APPLICATION THEREOF

CROSS-REFERENCE TO RELATED APPLICATIONS

The present application is a continuation application of PCT application No. PCT/CN2021/142277 filed on Dec. 29, 2021, which claims the benefit of Chinese Patent Application No. 202110330244.6 filed on Mar. 29, 2021. The contents of all of the aforementioned applications are incorporated by reference herein in their entirety.

TECHNICAL FIELD

The invention relates to a preparation process of a cathode material for a new energy lithium ion battery, and specifically relates to a material mixing process for preparing a high nickel cathode material and its application.

BACKGROUND

High nickel ternary material (Ni content≥50%) is one of the most popular lithium-ion cathode materials in the market today. To stand out from the fierce market, the key is to reducing the material's costs and improving the efficiency. The current conventional high nickel ternary material preparation process comprises steps of primary mixing of materials and primary calcination, then removing the residual lithium on the surface of the primary calcination product through a water washing process, followed by secondary mixing, secondary coating and calcination to obtain a final product. Among the steps, the key to limit the process productivity is the amount of loading materials for primary calcination. The common method of addressing the problem is to increase the loading capacity in an acceptable range based on the material properties, or to switch to a lithium source with a larger apparent density (such as $Li_2O$, $LiOH$, etc.).

At present, $LiOH \cdot H_2O$ or $Li_2CO_3$ is often used as lithium sources in the primary mixing process of high nickel ternary materials preparation, but the apparent density of these two lithium sources is about 0.4 $g/cm^3$, while a precursors' apparent density are generally about 1.4 $g/cm^3$. When the two are mixed, the obtained primary mixture will have a small apparent density due to the existence of the lithium source, which limits the actual loading capacity of a fixed-volume sagger (length, width, and height: 330*330*100 mm) during a primary calcination process. The related art mentions a method for pretreatment of ternary material materials. The purpose of this method is to remove the crystal water from lithium hydroxide monohydrate by infrared drying before mixing, thereby reducing the weight of the lithium source and improving the loading capacity in a calcination process which can promote productivity. But this method requires additional drying equipment. There is also a related art documenting a method for spraying coating additives solution on the cathode material substrate, and controlling the coating amount by controlling the amount of sprayed solution. The purpose of the spraying process is to adjust the coating uniformity and improve the material performance. And it is used in a secondary mixing process, which cannot effectively increase productivity. The related art also records a method for spraying a single crystal-like precursor to increase the capacity of a high nickel single crystal. The method first sprays additives into the precursor, then performing calcination to the precursor at a high temperature of 400-800° C., followed by grinding and crushing. Finally, it is mixed with a lithium source, and then calcinated at a high temperature to obtain the final product. It can be seen that this solution mainly aims to improve the material performance, and compared with a conventional process, it requires one more mixing process, one more crushing process and one more calcination process, hence the cost will be higher.

SUMMARY OF THE INVENTION

The present invention aims to solve at least one of the technical problems existing in the above-mentioned prior art. For this reason, the present invention proposes a material mixing process for preparing high-nickel cathode materials and its application. The mixing process can increase the apparent density of the high-nickel cathode material mixture, and promote the loading capacity in a primary calcination, so as to increase production capacity on the basis of the original process.

According to one aspect of the present invention, a material mixing process for preparing a high nickel cathode material is provided, which comprises the following steps:

S1: Adding a precursor and a lithium source to a mixing equipment for mixing to obtain a mixed material;

S2: Mixing the mixed material uniformly, spraying a liquid into the mixture while the mixing equipment is in operation;

S3: Discharging a resulting mixture to a sagger after the spraying of the liquid is completed, and performing calcination to obtain a product;

The liquid is one or more selected from the group consisting of pure water, ethanol, nitrogen methyl pyrrolidone, an additive solution and an additive dispersion.

In some embodiments of the present invention, in step S1, the additive is also added to mix with the precursor and the lithium source.

In some embodiments of the present invention, the molar content of Ni element in the high nickel cathode material accounts for more than 50% of the total molar content of the transition metals; the high nickel cathode material is lithium nickel-cobalt-manganese oxide, lithium nickel-cobalt-aluminum oxide or lithium nickel-cobalt-manganese-aluminum oxide.

In some embodiments of the present invention, the lithium source is one or more selected from the group consisting of $LiOH \cdot H_2O$, $LiOH$, $CH_3COOLi$, $Li_2O$ and $Li_2CO_3$.

In some embodiments of the present invention, the additive is one or more selected from a group consisting of a transition metal oxide, a transition metal salt, aluminum isopropoxide and butyl titanate; the additive solution is a solution obtained by dissolving the additive in pure water; the additive dispersion liquid is obtained by dispersing the additive in pure water.

In some embodiments of the present invention, the molar ratio of the lithium element in the lithium source to the transition metal in the precursor is (1-1.08):1.

In some embodiments of the present invention, in step S1, the mixing is carried out for 20-60 min.

In some embodiments of the present invention, in step S2, the spray is carried out at a speed of 0.1-10 g/s and an atomizing pressure o of 0.1-0.6 Mpa.

In some embodiments of the present invention, in step S2, the weight of the sprayed liquid is 1%-15% of the weight of the precursor.

In some embodiments of the present invention, in step S3, the volume of the mixture loaded into the sagger is ⅓-1 of the sagger volume, and the apparent density of the mixture is 0.4-1.5 g/cm³.

In some preferred embodiments of the present invention, the apparent density of the mixture is 0.7-1.5 g/cm³.

The invention also provides the application of the material mixing process in the preparation of lithium ion batteries.

According to a preferred embodiment of the present invention, it has at least the following beneficial effects:

1. The spray mixing process of the present invention does not require new large-scale equipment, and only needs to install a simple spray device on the basis of the original mixing equipment in the production line, which is a simple modification and low cost;

2. The spray mixing process of the present invention can obtain a more uniform mixture, and due to the presence of an appropriate amount of misty droplets, the surface of the lithium source is slightly soluble and can adsorb the precursor, thereby increasing the apparent density of the mixture, and then raise the loading capacity of the calcination by 5-40%, increasing the production capacity by 10-30%;

3. After spraying, the small amount of spray liquid in the mixture and the crystal water contained in the raw materials can be burned out or removed in the heating section of the calcination process, and will not affect the physical, chemical and electrical properties of the cathode material.

4. Since a mixed material in the primary mixing process of preparation a high-nickel ternary material contains strong alkali, usually the mixed material will try to avoid contact with a liquid during the mixing process to prevent uneven mixing and equipment corrosion. The invention goes off the beaten track and spraying the liquid during mixing, which not only allows the liquid to come into contact with the material to increase the apparent density, but also ensures the materials are mixed uniformly without affecting their properties. And the spray volume is small, having little damage to the equipment.

BRIEF DESCRIPTION OF DRAWINGS

The present invention will be further described below in conjunction with the accompanying drawings and embodiments, in which.

DETAILED DESCRIPTION OF ILLUSTRATED EXAMPLES

Figure 1:
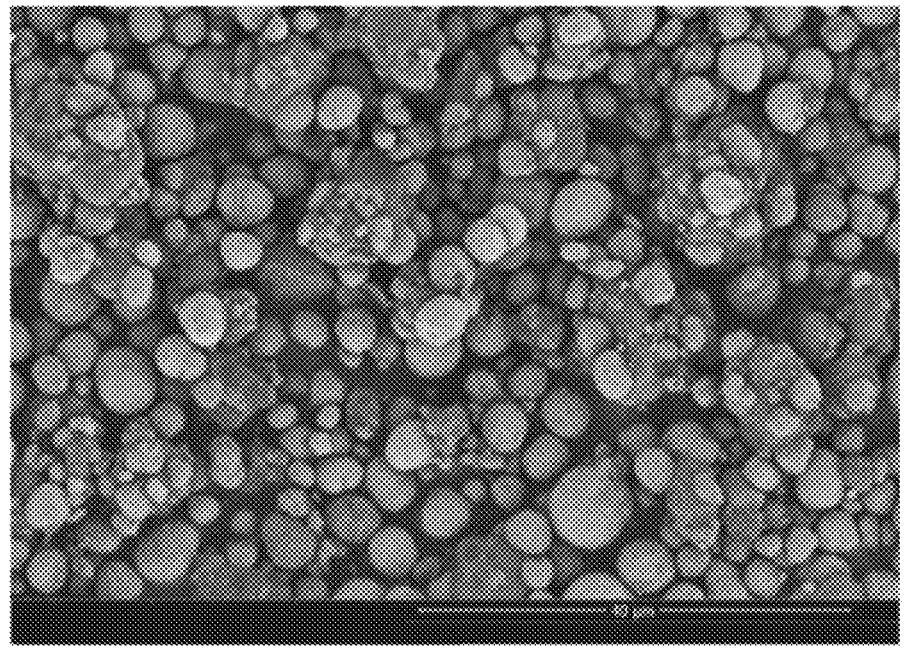
FIG. 1 is an SEM image of the one-time mixing in Example 1.

Hereinafter, the concept of the present invention and the technical effects produced by it will be described clearly and completely with reference to the embodiments, so as to fully understand the purpose, features and effects of the present invention. Obviously, the described embodiments are only a part of the embodiments of the present invention, rather than all of them. Based on the embodiments of the present invention, other embodiments obtained by those skilled in the art without creative work belong to the protection scope of the present invention.

Example 1

In this embodiment, a high-nickel ternary cathode material is prepared by the specific process as follows:

S1: Mixing a $Ni_{0.92}Co_{0.04}Mn_{0.04}(OH)_2$ precursor with $LiOH \cdot H_2O$, the molar ratio of Li in $LiOH \cdot H_2O$ to the transition metal in the precursor is 1.04; then adding appropriate amount of an additive and mixing for 30 min;

S2: After mixing uniformly, spraying pure water at a constant speed while keeping the mixing equipment running normally. The spraying is carried out at a speed of 1 g/s and an atomizing pressure of 0.5 Mpa, and the weight of the sprayed pure water is 8% of the weight of the precursor. Spraying pure water while mixing normally. Discharging a resulting mixture after the spraying is completed, to obtain a uniform primary mixture for preparation of a high-nickel ternary cathode material with high apparent density;

S3: Quickly loading the obtained primary mixture into a sagger with a length, width and height of 330*330*100 mm. The loading volume is ⅔ of the sagger volume. After scribing the mixture, shaking and vibrating the sagger, the loaded primary mixture is fed into the furnace for primary calcination, followed by crushing, water washing, secondary mixing and secondary calcination to finally obtain the high nickel ternary cathode material powder.

Example 2

In this embodiment, a high-nickel ternary cathode material is prepared, and the specific process is as follows:

S1: Mixing a $Ni_{0.80}Co_{0.10}Mn_{0.10}(OH)_2$ precursor and $LiOH \cdot H_2O$, the molar ratio of Li in $LiOH \cdot H_2O$ to the transition metal in the precursor is 1.03, then adding appropriate amount of an additive and mixing for 20 min;

S2: After mixing uniformly, spraying pure water at a constant speed while keeping the mixing equipment running normally. The spraying is carried out at a speed of 1 g/s at an atomizing pressure of 0.3 Mpa, and the weight of the sprayed pure water is 1% of the weight of the precursor. Spraying pure water while mixing normally. Discharging a resulting mixture after the spraying is completed, to obtain a uniform primary mixture for preparation of a high-nickel ternary cathode material with high apparent density;

S3: Quickly loading the obtained primary mixture into a sagger with a length, width and height of 330*330*100 mm. The loading volume is ⅓ of the sagger volume. After scribing the mixture, shaking and vibrating the sagger, the loaded primary mixture is fed into the furnace for primary calcination, followed by crushing, water washing, secondary mixing and secondary calcination to finally obtain the high nickel ternary cathode material powder.

Example 3

In this embodiment, a high-nickel ternary cathode material is prepared by the specific process as follows:

S1: Mixing a $Ni_{0.70}Co_{0.15}Mn_{0.15}(OH)_2$ precursor with $LiOH \cdot H_2O$, the molar ratio of Li in $LiOH \cdot H_2O$ to the transition metal in the precursor is 1.08; then adding appropriate amount of an additive and mixing for 60 min;

S2: After mixing uniformly, spraying pure water at a constant speed while keeping the mixing equipment running normally. The spraying is carried out at a speed of 10 g/s and an atomizing pressure of 0.6 Mpa, and the weight of the sprayed pure water is 10% of the weight of the precursor. Spraying pure water while mixing normally. Discharging a resulting mixture after the spraying is completed, to obtain a uniform primary mixture of a high-nickel ternary cathode material with high apparent density;

S3: Quickly loading the obtained primary mixture into a sagger with a length, width and height of 330*330*100 mm. The loading volume is ⅔ of the sagger volume. After scribing the mixture, shaking and vibrating the sagger, the loaded primary mixture is fed into the furnace for primary calcination, followed by crushing, water washing, secondary mixing and secondary calcination to finally obtain the high nickel ternary cathode material powder.

Example 4

In this embodiment, a high-nickel ternary cathode material is prepared by the specific process as follows:

S1: Mixing a $Ni_{0.60}Co_{0.20}Mn_{0.20}(OH)_2$ precursor with $Li_2CO_3$, the molar ratio of Li in $Li_2CO_3$ to the transition metal in the precursor is 1.0; then adding appropriate amount of an additive and mixing for 40 min;

that the comparative example performs calcination directly without spraying after mixing. The specific process is as follows:

S1: First mixing a $Ni_{0.92}Co_{0.04}Mn_{0.04}(OH)_2$ precursor and $LiOH \cdot H_2O$, the molar ratio of Li in $LiOH \cdot H_2O$ to the transition metal in the precursor is 1.04, adding appropriate amount of an additive, and mixing for 30 min. Discharging a resulting mixture to obtain a primary mixture for preparation of a high nickel ternary cathode material;

S2: Quickly loading the obtained primary mixture into a sagger with a length, width and height of 330*330*100 mm. The loading volume is ⅔ of the sagger volume. After scribing the mixture, shaking and vibrating the sagger, the loaded primary mixture is fed into the furnace for primary calcination, followed by crushing, water washing, secondary mixing and secondary calcination to finally obtain the high nickel ternary cathode material powder.

Test Example

In this test example, the performance of the high nickel ternary cathode material prepared from the mixture of Example 1 and Comparative Example 1. The property data of the intermediate products powder of the preparation process were tested, and the result is shown in Table 1.

TABLE 1

| | Comparison of powder data and electrochemical energy data in the preparation process of Example 1 and Comparative Example 1 | | | | | | | |
|---|---|---|---|---|---|---|---|---|
| | Primary mixture | | | | | | Final product | |
| | Loading volume to | Apparent | Primary calcination product | | | Discharging | 100 cycles capacity | Productivity |
| Source | sagger volume | density g/cm3 | LiOH wt % | $Li_2CO_3$ wt % | Total Li+ wt % | capacity mAh/g | retention rate % | promotion % |
| Example 1 | ⅔ | 0.82 | 0.5344 | 0.3145 | 0.2140 | 213.2 | 93.2 | 15.6 |
| Comparative Example 1 | ⅔ | 0.67 | 0.5146 | 0.3036 | 0.2062 | 213.6 | 92.8 | 0 |

S2: After mixing uniformly, spraying pure water at a constant speed while keeping the mixing equipment running normally. The spraying is carried out at a speed of 5 g/s and an atomizing pressure 0.5 Mpa, and the weight of the sprayed pure water is 6% of the weight of the precursor. Spraying pure water while mixing normally. Discharging a resulting mixture after the spraying is completed, to obtain a uniform primary mixture for preparation of a high-nickel ternary cathode material with high apparent density;

S3: Quickly loading the obtained primary mixture into a sagger with a length, width and height of 330*330*100 mm. The loading volume is ½ of the sagger volume. After scribing the mixture, shaking and vibrating the sagger, the loaded primary mixture is fed into the furnace for primary calcination, followed by crushing, water washing, secondary mixing and secondary calcination to finally obtain the high nickel ternary cathode material powder.

Comparative Example 1

In this comparative example, a high-nickel ternary cathode material is prepared. The difference from Example 1 is The above-mentioned Comparative Example 1 is a commonly used production process for high nickel ternary cathode materials in the current market. It can be seen from Table 1 that the apparent density of the primary mixture of Example 1 is significantly higher than that of Comparative Example 1. And after a calcination, the surface of the primary calcination product with spraying treatment has no significant increase in $Li_2CO_3$ or total residual lithium amount. The electrochemical performance of the final product in Example 1 is equivalent to that of Comparative Example 1, and the production capacity is increased by 15.6%, indicating that the mixing process of the present invention promotes the production capacity while not affecting the material performance.

Figure 2:
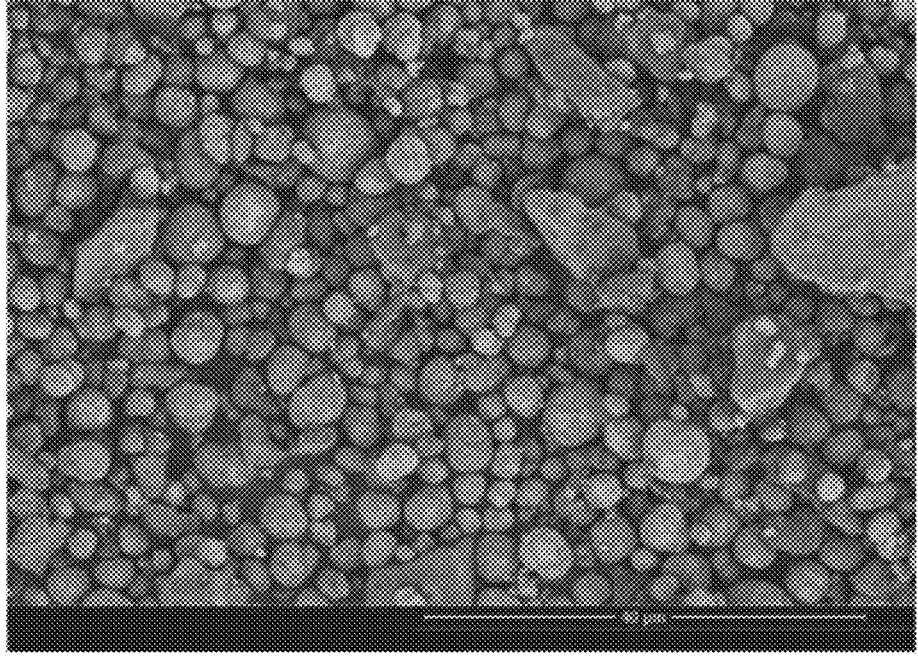
FIG. 2 is the SEM image of the primary mixing in Comparative Example 1.

FIG. 1 is the SEM image of the primary mixture in Example 1, and FIG. 2 is the SEM image of the primary mixing material in Comparative Example 1. Comparing FIG. 1 and FIG. 2, it can be seen that the surface viscosity of the lithium source increases due to the spraying of the liquid, and then fine precursor articles are absorbed and form spheres, thereby significantly increasing the apparent density of the mixture.

Figure 3:
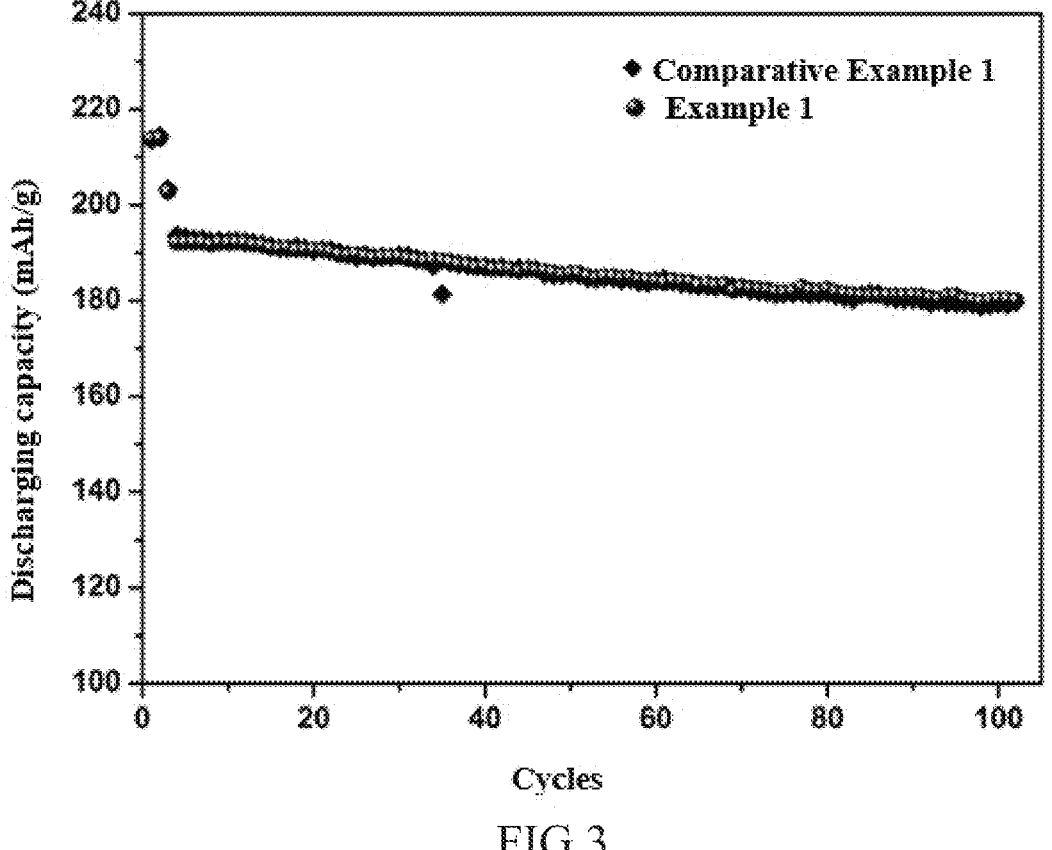
FIG. 3 is a cycle graph of the high nickel ternary cathode material of Example 1 and Comparative Example 1.

FIG. 3 is the cycle performance graph of the finished products of Example 1 and Comparative Example 1 (half-cell, 2.8-4.25V, 1C, 100 cycles). It can be seen that the cycle stability trends of the two are basically at the same level, indicating that the present invention promotes the production capacity significantly by adopting the spray treatment while having no effect on the electrochemical performance of the materials.

The embodiments of the present invention have been described in detail above with reference to the accompanying drawings. However, the present invention is not limited to the above-mentioned embodiments. Within the scope of knowledge possessed by those of ordinary skill in the art, various modifications can be made without departing from the purpose of the present invention. Variety. In addition, in the case of no conflict, the embodiments of the present invention and the features in the embodiments can be combined with each other.

The invention claimed is:

1. A mixing process for preparing a high nickel cathode material, comprising the following steps:

S1: adding an additive, a precursor and a lithium source to a mixing equipment for mixing to obtain a mixed material; a molar ratio of lithium element in the lithium source to a transition metal in the precursor is (1-1.08): 1; and the additive is one or more selected from the group consisting of aluminum isopropoxide and butyl titanate;

S2: mixing the mixed material uniformly and then spraying a liquid to the mixed material while the mixing equipment is in operation; the spraying is carried out at a spray velocity of 0.1-10 g/s and an atomizing pressure of 0.1-0.6 Mpa, a weight of the liquid sprayed is 1%-15% of a weight of the precursor; and S3: discharging a resulting mixture directly to a sagger after the spraying of the liquid is completed, calcinating the resulting mixture to obtain a product;

the liquid is one or more selected from the group consisting of pure water, ethanol and nitrogen methyl pyrrolidone, in step S3, a volume of the resulting mixture in the sagger is ⅓-1 of a volume of the sagger, and an apparent density of the resulting mixture is 0.7-1.5 $g/cm^3$; a molar content of Ni in the high nickel cathode material accounts for more than 50% of a total molar content of transition metals; the lithium source is one or two selected from the group consisting of $LiOH \cdot H_2O$ and LiOH.

2. The mixing process according to claim 1, wherein the high nickel cathode material is lithium nickel-cobalt-manganese oxide, lithium nickel-cobalt-aluminum oxide or lithium nickel-cobalt-manganese-aluminum oxide.

3. The mixing process according to claim 1, wherein in step S1, the mixing is carried out for 20-60 min.

* * * * *